UNITED STATES PATENT OFFICE.

CYRUS M. WARREN, OF BROOKLINE, MASSACHUSETTS.

IMPROVEMENT IN COMPOSITION ROOFING.

Specification forming part of Letters Patent No. 180,081, dated July 18, 1876; application filed March 22, 1876.

*To all whom it may concern:*

Be it known that I, CYRUS M. WARREN, of Brookline, in the county of Norfolk, in the State of Massachusetts, have invented a new and Improved Roofing Material, which invention is fully set forth in the following specification.

This invention consists in a roofing material consisting of native bitumen, or mixture of bitumens, with or without an admixture of petroleum-residuum, or equivalent non-volatile material, combined with pine or wood tar, or other equivalent material, such as coal-tar, "dead-oil," resin-oil, or other vegetable oils; also, in a roofing material made of paper or felt, coated or saturated with a compound of native bitumen, or mixture of bitumen, and pine or wood tar, or other equivalent material, either with or without an admixture of petroleum-residuum, or equivalent non-volatile material.

In preparing a roofing material great care should be taken to provide a material which will not be injuriously acted upon by the atmosphere or changes of temperature, and which will not suffer material loss by evaporation on exposure to the sun, but which may be readily melted by artificial heat, and spread on the roof, or used for saturating or coating paper or felt.

The roofing materials most commonly used in the manufacture of flat roofs—such as coal-tar and coal-tar pitch—are largely composed of volatile matter, and if these materials are spread on a roof, and exposed for a certain time to the action of the atmosphere, the volatile matter evaporates, the roofing material becomes brittle and full of cracks, and the roof is spoiled; or, if such roofing materials are applied to paper or felt, this paper or felt, when spread on a roof, becomes hard and brittle as soon as the volatile matter has evaporated, and is thus rendered unfit for the foundation of a roof.

In order to overcome these objections I have selected, as the more essential constituents of my roofing material, ingredients which contain little or no volatile matter, such as the native bitumens, or combinations of these with other non-volatile materials, to which I add a suitable quantity of pine or wood tar, or other equivalent material—such as coal-tar, dead-oil, rosin-oil, or other vegetable oil, or mixture of oils, all of which contain more or less of volatile matter, or are susceptible of becoming resinous by absorption of oxygen, and are therefore more or less liable, from these causes, to become eventually hard and brittle.

The object of mixing such volatile matter with the native bitumens, or with a combination of these materials with other non-volatile materials, as above stated, is, first, to reduce the bitumen to the consistency of ordinary pitch when required as a cement to spread on the roof; or, second, to the consistency of thick tar, if it is to be used for saturating paper or felt; and, third, to accomplish these objects at a reduced cost, in order to adapt the price of the material to the requirements for cheap and temporary buildings, since the volatile materials—such as pine or coal tar—can be obtained in any desired quantities at comparatively little expense, while the non-volatile softening materials—such as the heavy oil or residuum of petroleum, heavy oil of bitumen, "candle-tar," &c., which would be greatly preferable but for their higher cost—are less abundant and more expensive.

The proportion in which I mix pine-tar or any other equivalent volatile softening material, or mixture of two or more of such volatile softening materials, with native bitumen and the heavy oil or residuum of petroleum or other non-volatile material, or mixture of two or more of such non-volatile materials, depends, first, upon the consistency of the material to be used, (which is variable from time to time, and from different localities; hence definite proportions of general application cannot be stated,) as, for example, whether the bitumen is very hard or of medium hardness; and, second, upon the object for which, and places in which, the compound is to be employed. If the compound is to be used for saturating paper or felt, the proportion of the volatile and liquid material or materials should be greater than when the compound is to be spread on the roof as a binding material for gravel.

As a saturating material for paper or felt, the proportions of the ingredients should be such as will produce a compound of about the consistency of thick tar; and, for a cementing material to spread on a flat roof, the proportions should be varied to produce a compound of about the consistency of ordinary pitch.

What I claim, and desire to secure by Letters Patent, is—

1. A roofing material composed of native bitumen, or mixture of bitumens, and pine or wood tar, or other equivalent material, substantially as set forth.

2. A roofing material composed of paper or felt saturated or coated, or both, with a compound of native bitumen, or mixture of bitumens, and pine or wood tar, or other equivalent material, substantially as set forth.

In testimony that I claim the foregoing I have hereunto set my hand and seal this 13th day of March, 1876.

CYRUS M. WARREN. [L. S.]

Witnesses:
 HERBERT M. WARREN,
 BENJ. H. CURRIER.